(12) United States Patent
Albertson et al.

(10) Patent No.: US 7,474,310 B2
(45) Date of Patent: Jan. 6, 2009

(54) OBJECT ASSOCIATION IN A COMPUTER GENERATED DRAWING ENVIRONMENT

(75) Inventors: Dan R. Albertson, Issaquah, WA (US); Barry Christopher Allyn, Snohomish, WA (US); Daniel J. Clay, Newcastle, WA (US); Craig L. Daw, Bellevue, WA (US); Evan F. B. Moran, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 278 days.

(21) Appl. No.: 11/203,678

(22) Filed: Aug. 12, 2005

(65) Prior Publication Data

US 2007/0036403 A1    Feb. 15, 2007

(51) Int. Cl.
G06T 11/20 (2006.01)
(52) U.S. Cl. .................... 345/440; 283/115; 283/34; 382/128
(58) Field of Classification Search ............ 345/440; 382/128; 283/115, 34
See application file for complete search history.

(56) References Cited

U.S. PATENT DOCUMENTS

| | | | |
|---|---|---|---|
| 5,511,218 A | 4/1996 | Castelaz | |
| 5,883,639 A | 3/1999 | Walton et al. | |
| 5,898,434 A | 4/1999 | Small et al. | |
| 6,065,021 A * | 5/2000 | George | 715/245 |
| 6,268,766 B1 * | 7/2001 | Thomasson | 327/557 |
| 7,093,192 B2 * | 8/2006 | Mullen et al. | 715/202 |
| 2002/0018526 A1 * | 2/2002 | Osaka et al. | 375/257 |
| 2003/0200071 A1 * | 10/2003 | Zhang et al. | 703/15 |
| 2005/0108620 A1 * | 5/2005 | Allyn et al. | 715/500 |
| 2005/0276135 A1 * | 12/2005 | Yonezawa | 365/203 |
| 2006/0245217 A1 * | 11/2006 | Kirbie et al. | 363/60 |
| 2006/0259872 A1 * | 11/2006 | Mullen et al. | 715/764 |

FOREIGN PATENT DOCUMENTS

| | | |
|---|---|---|
| WO | WO98/29817 | 7/1998 |
| WO | WO01/48625 | 7/2001 |

OTHER PUBLICATIONS

Bruce Carter, "Using Texas instruments Spice Model in Pspice" dated Sep. 2001.*
International Search Report for International Application No. PCT/US2006/031540, Jan. 9, 2007.

* cited by examiner

*Primary Examiner*—Kee M Tung
*Assistant Examiner*—J. Amini
(74) *Attorney, Agent, or Firm*—Perkins Coie LLP

(57) ABSTRACT

Methods and systems for associating two objects in a drawing application with one another are provided. Embodiments of the invention are directed toward a method in a computing environment that includes receiving a command to designate a target and designating the target. The method can further include identifying a subject and providing a suggested association of the subject with the target. The method can still further include receiving a command to accept the suggested association and associating the subject with the target as suggested.

19 Claims, 14 Drawing Sheets

OBJECT ASSOCIATION IN A COMPUTER GENERATED DRAWING ENVIRONMENT

BACKGROUND

Various computer applications are available that allow users to produce drawings using the computer. Many of these applications, however, are complex and complicated to use. For example, when a user is drawing or revising a process flow chart or a hierarchy chart, various drawing components must be created, placed relative to one another, and connected to provide context and meaning. The process of creating, placing, and connecting components can require multiple manual steps, and can be difficult, time consuming, and frustrating for the user.

Additionally, in some circumstances, the user must choose between various types of connections, further complicating the process. For example, some applications provide both simple and glued connections. The simple connection places a connection line between two components (e.g., at a specific point in space). When one of the components moves, the connection line remains fixed in space and no longer connects the two components. Conversely, the glued connection places a line between two components and automatically adjusts the connection line so that the two components remain connected when one of the components is moved. If the user chooses the wrong type of connection for the type of drawing being made, the resulting drawing can be even more difficult to revise in the future.

Various arrangements have been used to simplify the process of creating and placing components. For example, Visio®, available from the Microsoft Corporation of Redmond, Wash., provides the user with the ability to cut, copy, or move drawing components, and/or the ability to select components from a master shape container or window. Additionally, Visio® provides a stamping tool which allows a shape to be selected and then dropped at various locations in a drawing by placing the pointer at the desired location and clicking on a mouse button. The stamping tool, however, does not suggest the placement of the shape and does not provide any connection between the shape dropped into the drawing and other pre-existing shapes. Accordingly, the user must decide precisely (e.g., the precise direction and distance) where to place the component and then manually connected the dropped shape to pre-existing shapes, if desired.

SUMMARY

Methods and systems for providing suggestions or hints regarding the association of objects (e.g., the placement and/or connection of objects) in a drawing application are provided. For example, a computer implemented method can include designating a target object or shape in a drawing. The method can further include identifying a subject object or shape to be associated with the target object and providing a suggested association (e.g., placement and/or connection) of the subject object with the target object. The method can still further include receiving a command to accept the suggested association (and associating the subject with the target as suggested. Under certain circumstances, this method can allow one object to be placed and connected to another object quickly and easily by simply accepting a suggestion provided by the computing environment implementing the method.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Methods and systems for associating two objects in a drawing application (including diagramming applications) with one another are provided. Embodiments of the invention are directed toward a method in a computing environment that includes receiving a command to designate a target and designating the target. The method can further include identifying a subject and providing a suggested association of the subject with the target. The method can still further include receiving a command to accept the suggested association and associating the subject with the target as suggested.

Other embodiments of the invention are directed toward a method in a computing environment for associating two objects in a drawing application with one another, where the method includes receiving a command to designate a target object and designating the target object. The method can further include displaying a visual indicator identifying a direction relative to the target object and identifying a subject object The method can still further include receiving a command to accept the direction identified by the visual indicator and placing the subject object relative to the target object in the direction identified by the visual indicator. The method can yet further include connecting the target object and the subject object with a connector object. The method can still further include removing the visual indicator.

Still other embodiments of the invention are directed toward a computer-readable medium containing instructions for controlling a computing environment to perform a method that includes receiving a command to designate a target and designating the target. The method can further include identifying a subject and providing a suggested association of the subject with the target. The method can still further include receiving a command to accept the suggested association and associating the subject with the target as suggested.

Figure 1:
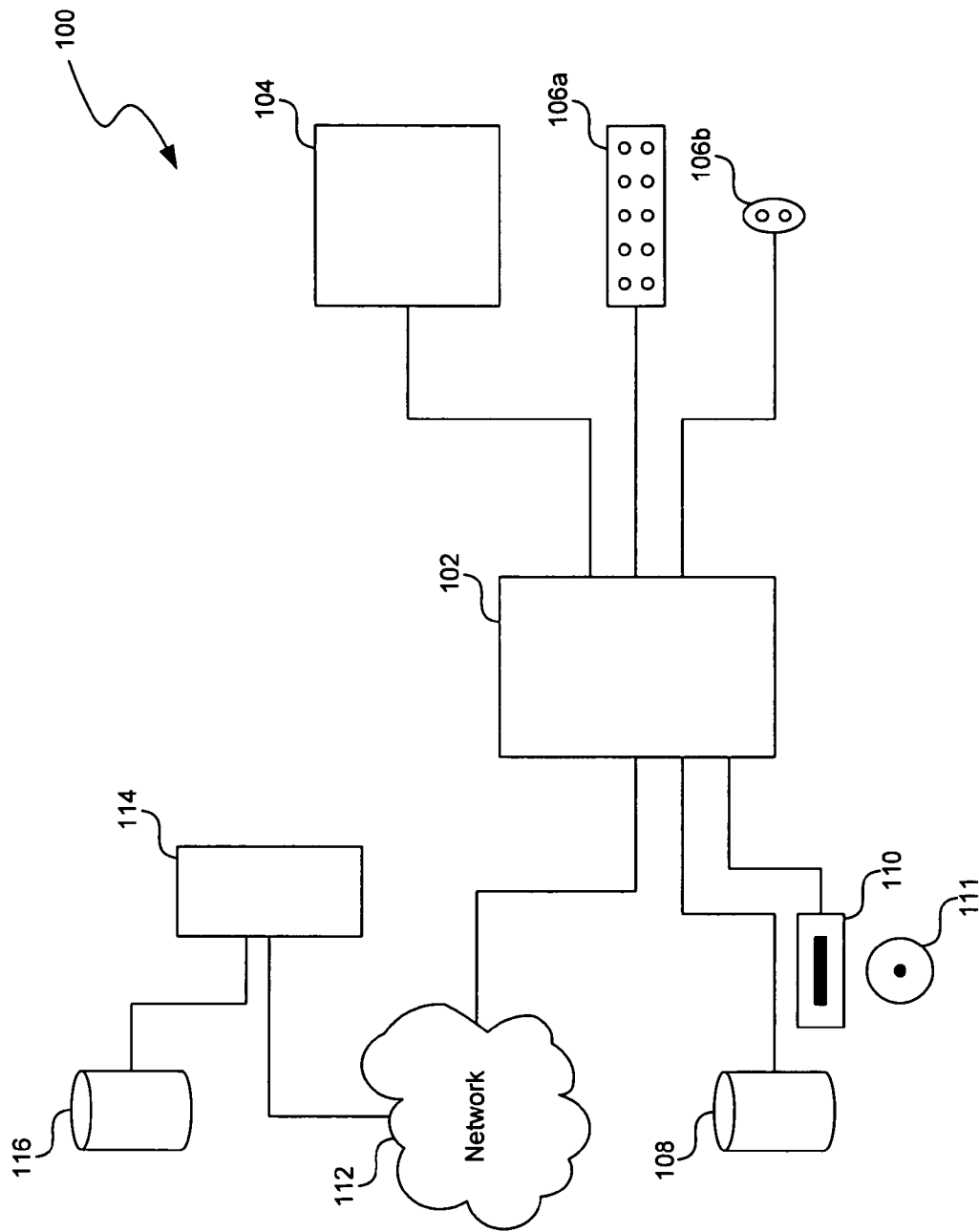
FIG. 1 is a block diagram that illustrates a computing environment suitable for implementing a process for associating two objects in a drawing application with one another in accordance with embodiments of the invention.

FIG. 1 is a block diagram that illustrates a computing environment suitable for implementing a process for associating two objects in a drawing application with one another in accordance with embodiments of the invention. The computing environment 100 can include a computing or computer system 102 that can be operably connected or coupled to a display 104 and one or more input devices, for example, a keyboard 106a and a pointing device 106b (e.g., a mouse). Additionally, the computer system 102 can communicate with one or more storage devices (e.g., a hard drive 108 with one or more databases) and one or more devices 110 for reading other types of computer readable mediums (e.g., devices for reading disks 111). The computer system 102 can also communicate via a network 112 (e.g., the Internet) with other devices or systems. For example, in the illustrated embodiment the computer system 102 can communicate with another computer system 114 and/or another database 116 via the network 112. In other embodiments, the computing environment can have other arrangements, including more, fewer, and/or different components.

For example, the computing device or environment on which the system is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
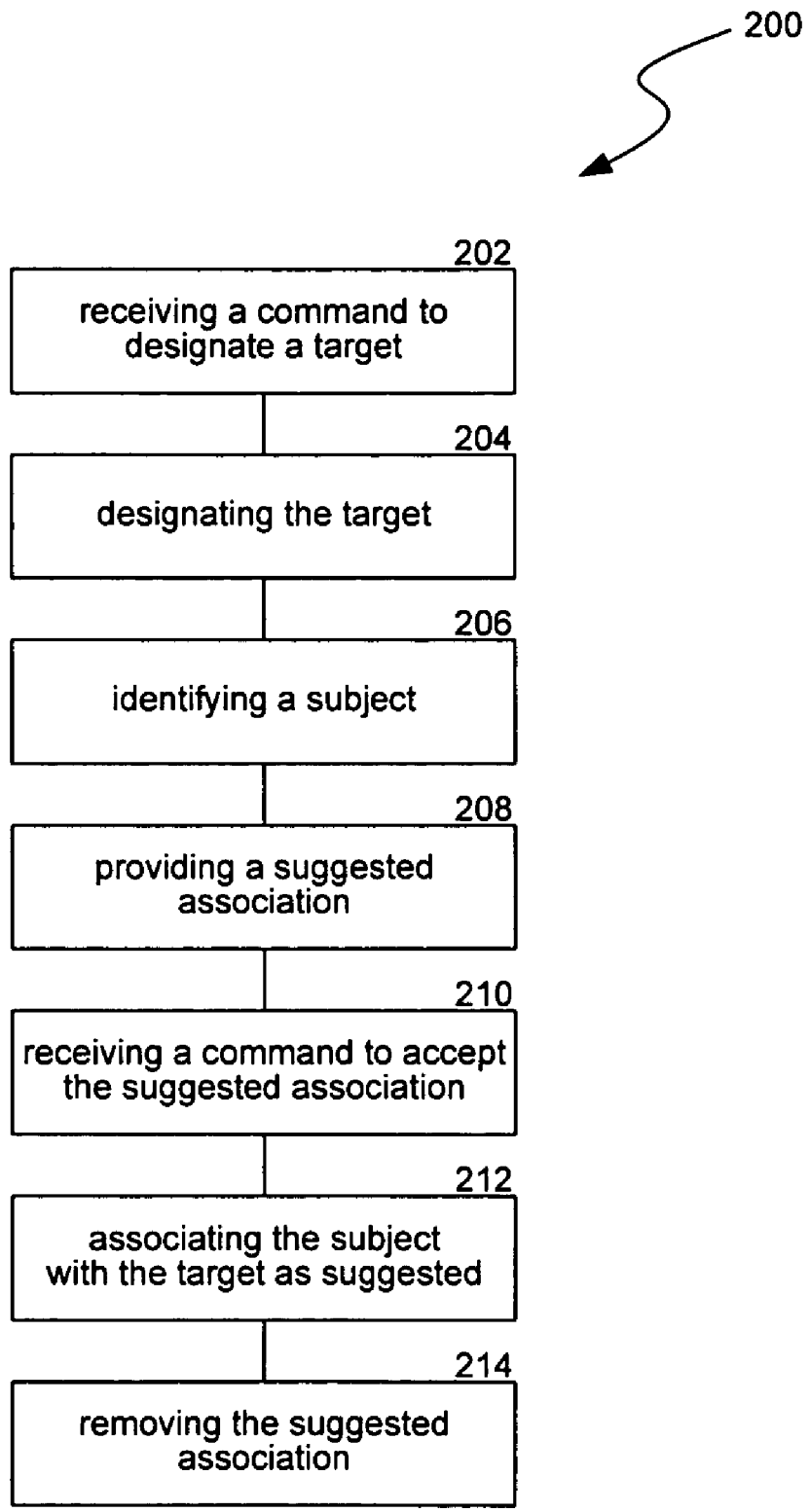
FIG. 2 is a flow diagram that illustrates a process for associating two objects in a drawing application with one another in accordance with various embodiments of the invention.

FIG. 2 is a flow diagram that illustrates a process 200 for associating two objects in a drawing application with one another in accordance with various embodiments of the invention. The process can be carried out in a computing environment and can include receiving a command to designate a target (process portion 202) and designating the target (process portion 204). The method can further include identifying a subject (process portion 206). In certain embodiments, identifying a subject can include receiving a command (e.g., from a user) to designate a subject from one and more objects in a drawing area and/or an area separate from the drawing area, and designating the subject as commanded. In other embodiments, identifying a subject can include suggesting a subject designation, receiving a command to accept the suggested subject designation, and designating the subject.

The method can still further include providing one or more suggested associations of the subject with the target (process portion 208), receiving a command to accept one of the suggested associations (process portion 210), and associating the subject with the target as suggested by the accepted suggested association (process portion 212). The method can yet further include removing the one or more suggested associations (process portion 214). In selected embodiments, this process can provide a user with a quick, effective, and efficient process to create, place, and/or connect two objects in a drawing by accepting suggestions generated by the computing environment. This feature can be particularly useful in drawing applications that use relational shapes and/or symbols (e.g., process flow charts, logical network diagrams, physical network drawings, organizational charts, other hierarchy charts, and the like). FIGS. 3-14 illustrate selected embodiments of the invention.

Figure 3:
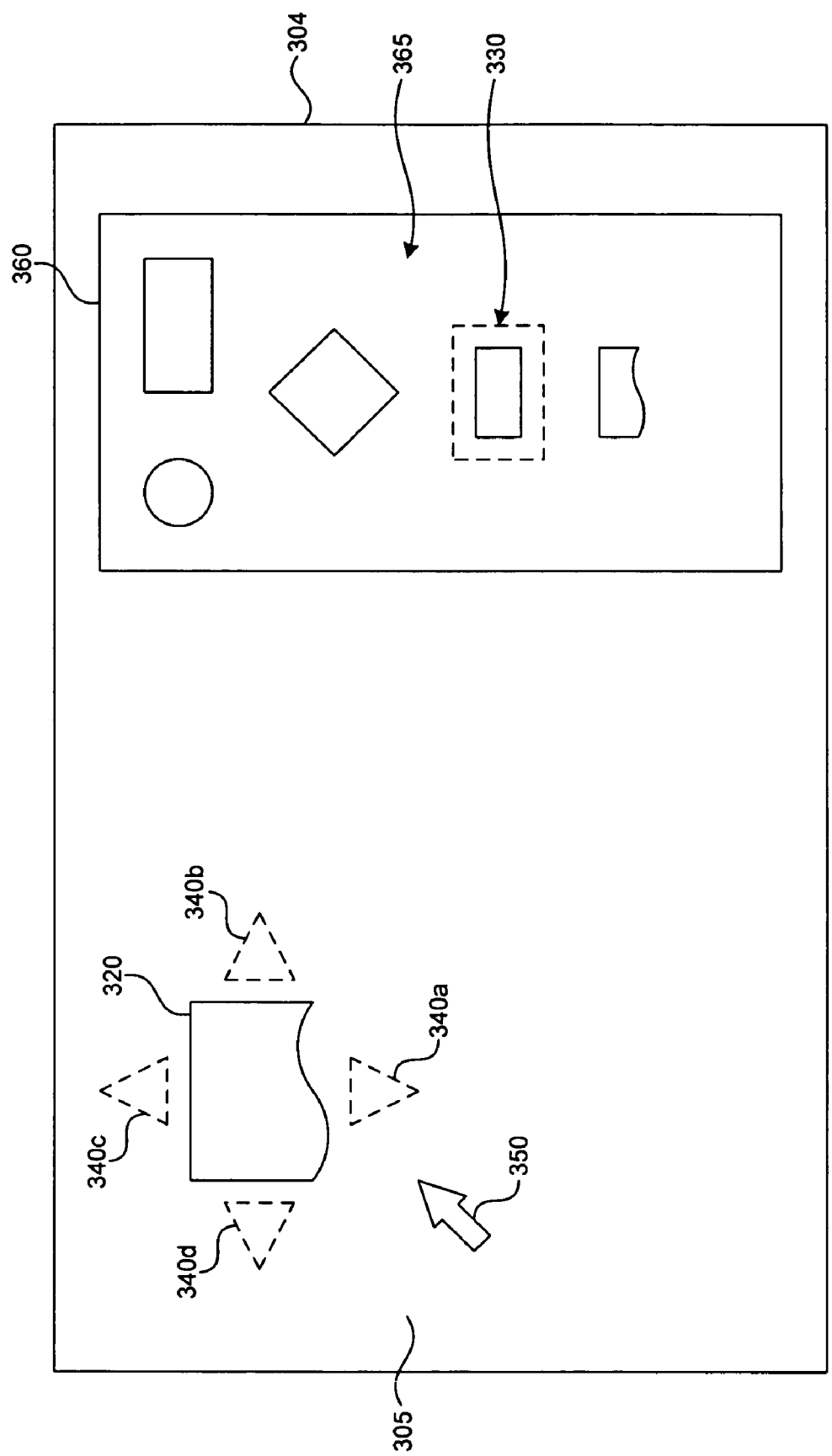
FIG. 3 is a partially schematic illustration of a display having at least one suggested association of a subject and a target in accordance with certain embodiments of the invention.

FIG. 3 is a partially schematic illustration of a display 304 having at least one suggested association 340 of a subject object or subject 330 and a target object or target 320 in accordance with certain embodiments of the invention. In FIG. 3, one of the objects 365 in the window or area 360 has been identified as the subject 330, as indicated by the ghosted outline. For example, the computing environment can receive a command from a user to designate the subject 330 from the object(s) 365 in the area 360 and can designate the subject 330 as commanded, thereby identifying the subject 330. In the illustrated embodiment, the user designated the subject 330 by placing the cursor 350 proximate to the selected or desired object 365 by using a mouse and "clicking" a mouse button to designate the selected object 365 as the subject 330. In other embodiments, other methods can be used to designate the subject 330, for example, by tabbing through a list with a keyboard and using the enter key to designate the subject 330. The identification of a subject 330 can also be indicated in other manners. For example, in other embodiments the subject designation can be indicated by a color change, shading, reverse video, highlighting, of the like.

In the illustrated embodiment, the area 360 is separate from a drawing area 305 where the target drawing is being made (e.g., the drawing which has or will have the designated target 320) and includes a window or "container" with a list of objects 365. When the subject 330 is identified from the list of objects 365, as discussed below in further detail, the associated object 365 can eventually be created, re-created, copied, moved, or placed in the drawing area 305 so that it can be associated with the target 320. In other embodiments, the list of objects 365 can be represented in a different fashion, for example, a word list can be used to identify one or more objects 365. In still other embodiments, the area 360 can include another drawing or document (e.g., associated or unassociated with the current drawing application) and an object 365 can be identified as the subject 330 in a manner similar to that described above with reference to the "container" of objects. In yet other embodiments, an object 365 in the drawing area 305 can be identified as the subject 330 using a similar process.

In the illustrated embodiment, the user has commanded the designation of the target 320 by hit testing a selected object or placing the cursor 350 proximate to (e.g., near or over) the selected object in the drawing area. The computing environment has received the command, designated the selected object as the target, and provided at least one suggested association 340 of the subject 330 with the target 320. In FIG. 3, there are four suggested associations 340 shown as a first suggested association 340a, a second association 340b, a third association 340c, and a fourth association 340d.

In the illustrated embodiment, the suggested associations 340 are shown or displayed as visual indicators identifying a direction relative to the target 320. In certain embodiments, the suggested associations 340 or visual indicators can indicate a suggested direction for placing the subject 330 relative to the target 320 and/or extending a connector (e.g., for connecting the subject 330 to the target 320) away from the target. Additionally, in FIG. 3 the suggested associations 340 are ghosted or subdued indicating that the user has not selected or accepted any of the suggested associations 340. In other embodiments, the method can provide more, fewer, or different kinds of suggested associations 340. In certain embodiments, suggested associations 340 are not provided for all objects in a drawing (e.g., when certain objects are hit tested no suggested associations 340 are provided). For example, in selected embodiments suggested associations 340 are not displayed for connector s and connectors cannot be designated as targets 320.

Figure 4:
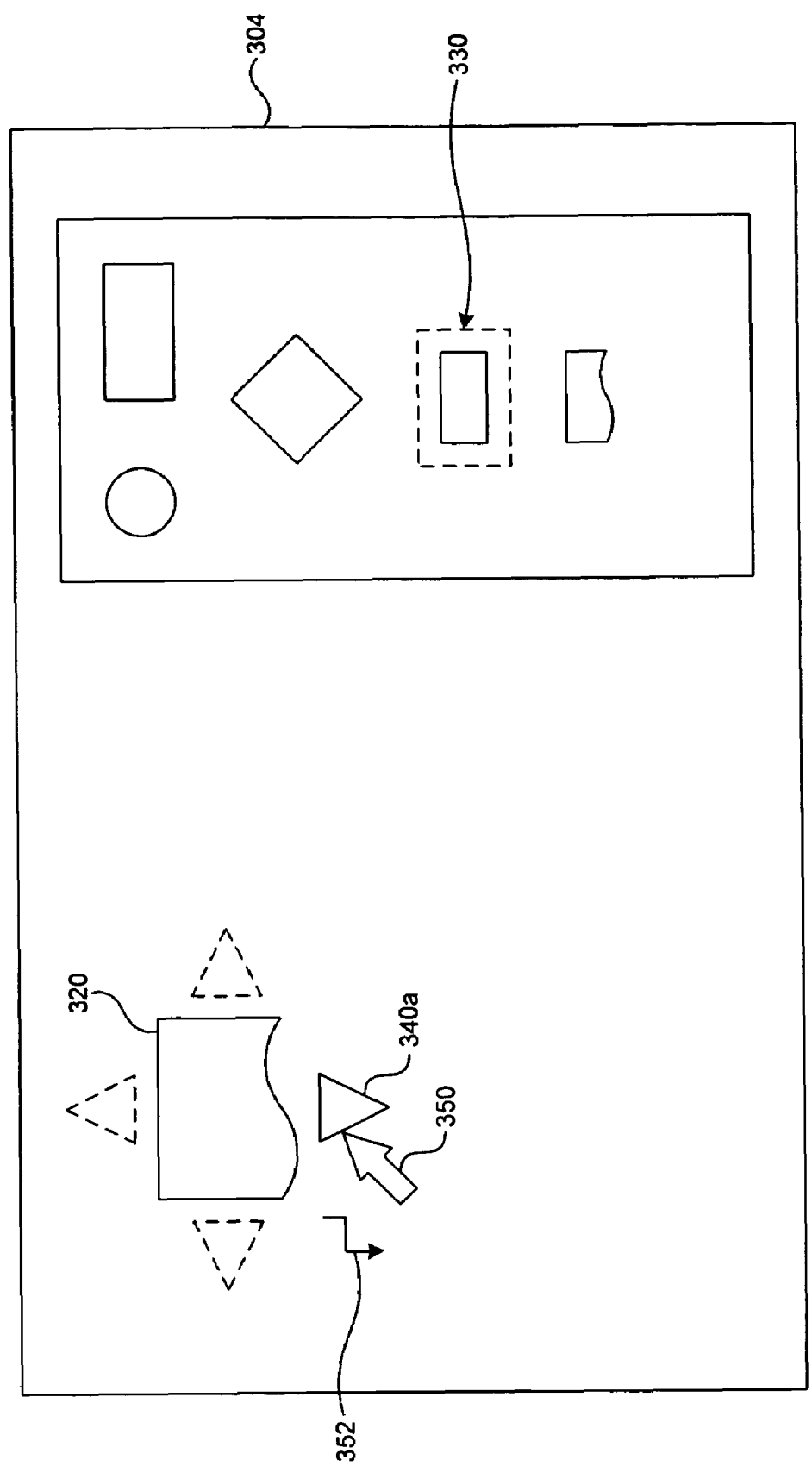
FIG. 4 is a partially schematic illustration of the display shown in FIG. 3 where a user is commanding an acceptance of one of the suggested associations.

In FIG. 4 the user has moved the cursor 350 proximate to the first suggested association 340a. The first suggested association 340 is no longer ghosted, indicating that the user has selected the first suggested association 340a, however, in the illustrated embodiment the user has not accepted the suggestion. The connector symbol 352 proximate to the cursor 350 indicates that the user can accept the selected suggested association 340 by entering an appropriate command, for example, by clicking a mouse button while the cursor 350 is proximate to the first suggested association 340a (e.g., using a "point and click" type scheme).

In the illustrated embodiment, the user can ignore or not accept the suggested association(s) 340 by not entering a command to accept the suggested association 340. The user can then move the cursor 350 away from the selected object, use a different tool in the drawing application, or the like. In other embodiments, other indications can be used to show that the user can accept the selected suggestion. For example, in selected embodiments there is no connector symbol 352 and the un-ghosting of a suggested association indicates that the user can accept the suggestion. In other embodiments, other indicators can be used (e.g., the cursor 350 can change shape or color when the user can select a suggestion). In still other embodiments no indications are used.

Figure 5:
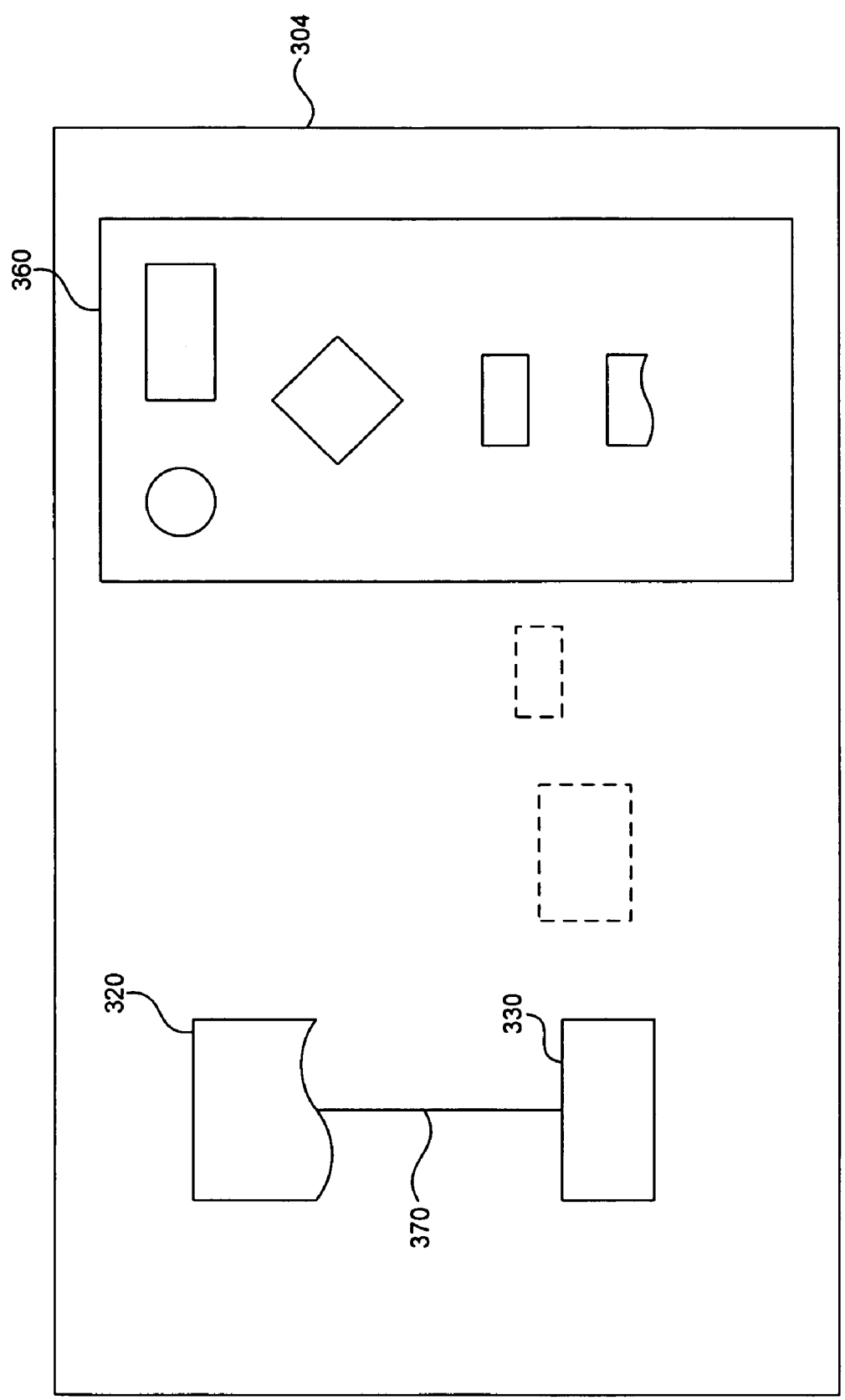
FIG. 5 is a partially schematic illustration of the display in FIG. 4 where the subject has been associated with the target as suggested.

In FIG. 5 the user has accepted the first suggested association 340 and, upon receiving the command, the computing environment has associated the subject 330 with the target 320 as suggested by the first suggested association 340a. For example, in certain embodiments associating the subject 330 with the target 320 can include placing the subject 330 relative to the target 320 in a selected direction and/or connecting the target 320 with the subject 330 with a connector object or connector 370 (e.g., a line, a directional line, a ghosted line, a rectangular object, or the like). In other embodiments, the subject 330 and the target 320 can be connected by a connector that extends away from the target in a direction that was indicated by the first suggested association 340a. In still other embodiments, the subject 330 can be associated with the target 320 in other ways and/or for other purposes. For example, in selected embodiments a circle or sphere can be placed around the subject 330 and target 320 to indicate that they are part of a selected grouping of items.

Additionally, in FIG. 5 the suggested associations 340 have been removed (e.g., to de-clutter the drawing). Also, as shown in FIG. 5, in certain embodiments animation can be used, for example, to provide additional feedback to the user. In FIG. 5, animation was used to show a copy of the subject 330 moving from the window 360 to its position in the drawing (as indicated by the ghosted symbols). The animation can show the subject 330 change in size as it moves from the window 360 to its position in the drawing and can then disappear. In other embodiments, the animation can take other forms. For example, in certain embodiments the animation can simply show a series of dots moving from the position of the subject 330 in the window 360 to the position of the subject 330 in the drawing.

Figure 6:
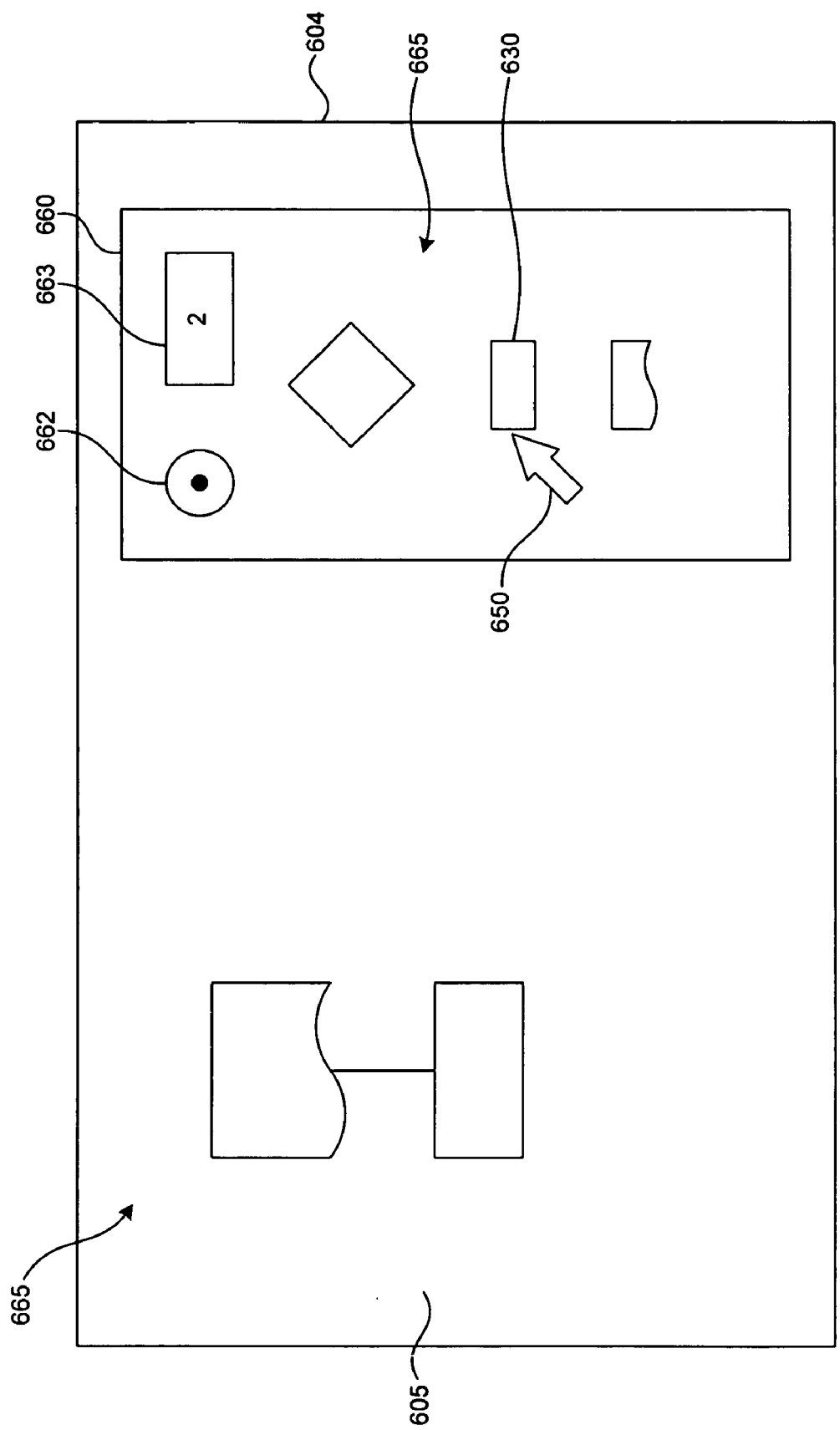
FIG. 6 is a partially schematic illustration of a display where a user is commanding a designation of multiple subjects in accordance with other embodiments of the invention.

FIG. 6 is a partially schematic illustration of a display 604 where a user is commanding a designation of multiple subjects 630 in accordance with other embodiments of the invention. In FIG. 6, the user has designated an object 665 in an area 660 as a subject 630. The user has selected the multiple radio button 662 and entered the number 2 into the data field 663 to indicate that multiple (e.g., two) subjects 630 are being identified in the illustrated embodiment, the user commanded the designation of the associated object 665 by placing the cursor 650 proximate to the object and holding a mouse button down. The user can then move or "drag" the subjects 630 toward an object 665 in a drawing area 605 (e.g., by holding the mouse button down and moving the cursor 350).

Figure 7:
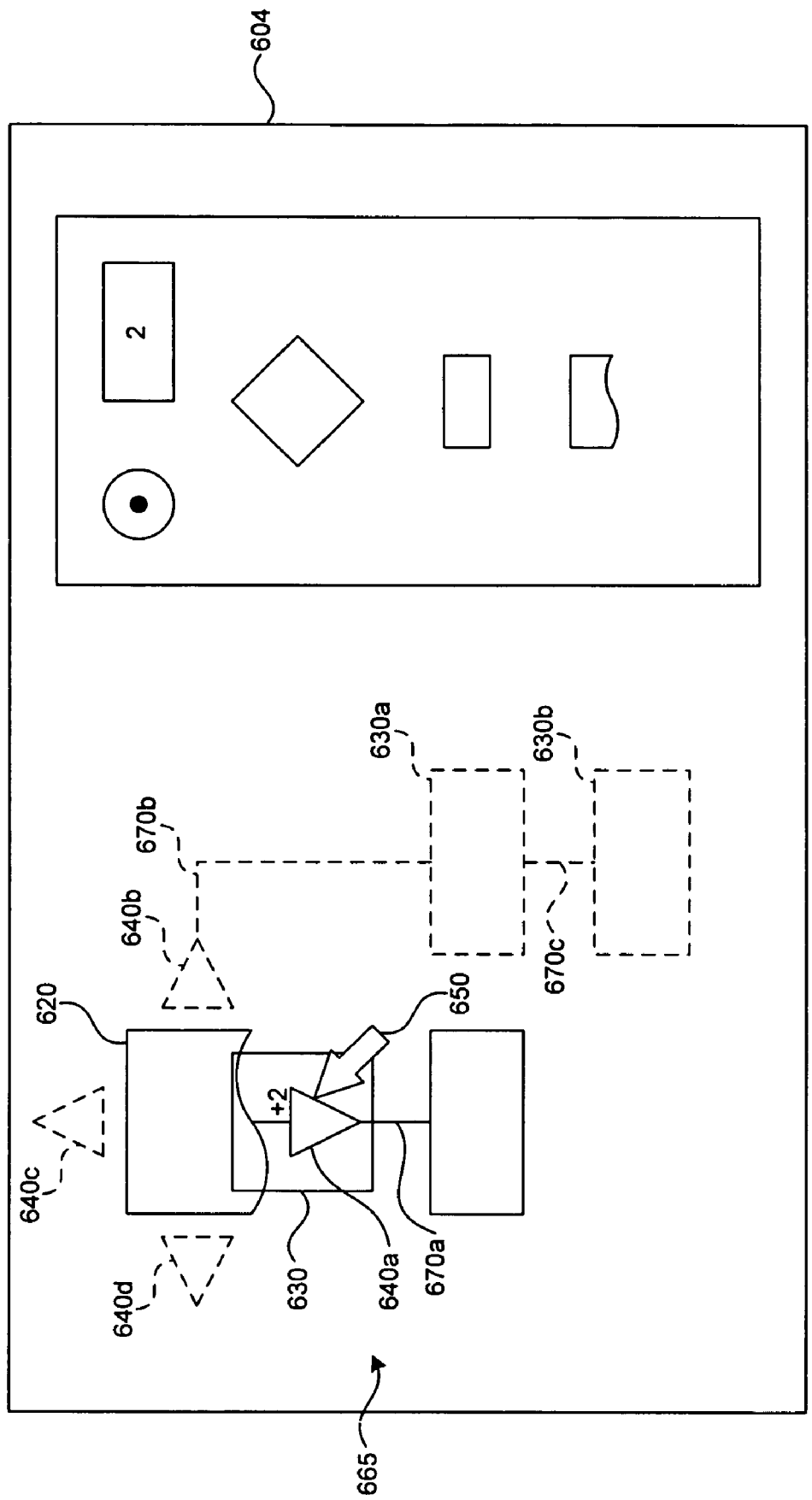
FIG. 7 is a partially schematic illustration of the display shown in FIG. 6 where the user is commanding an acceptance of a suggested association of a target with the subjects.
Figure 8:
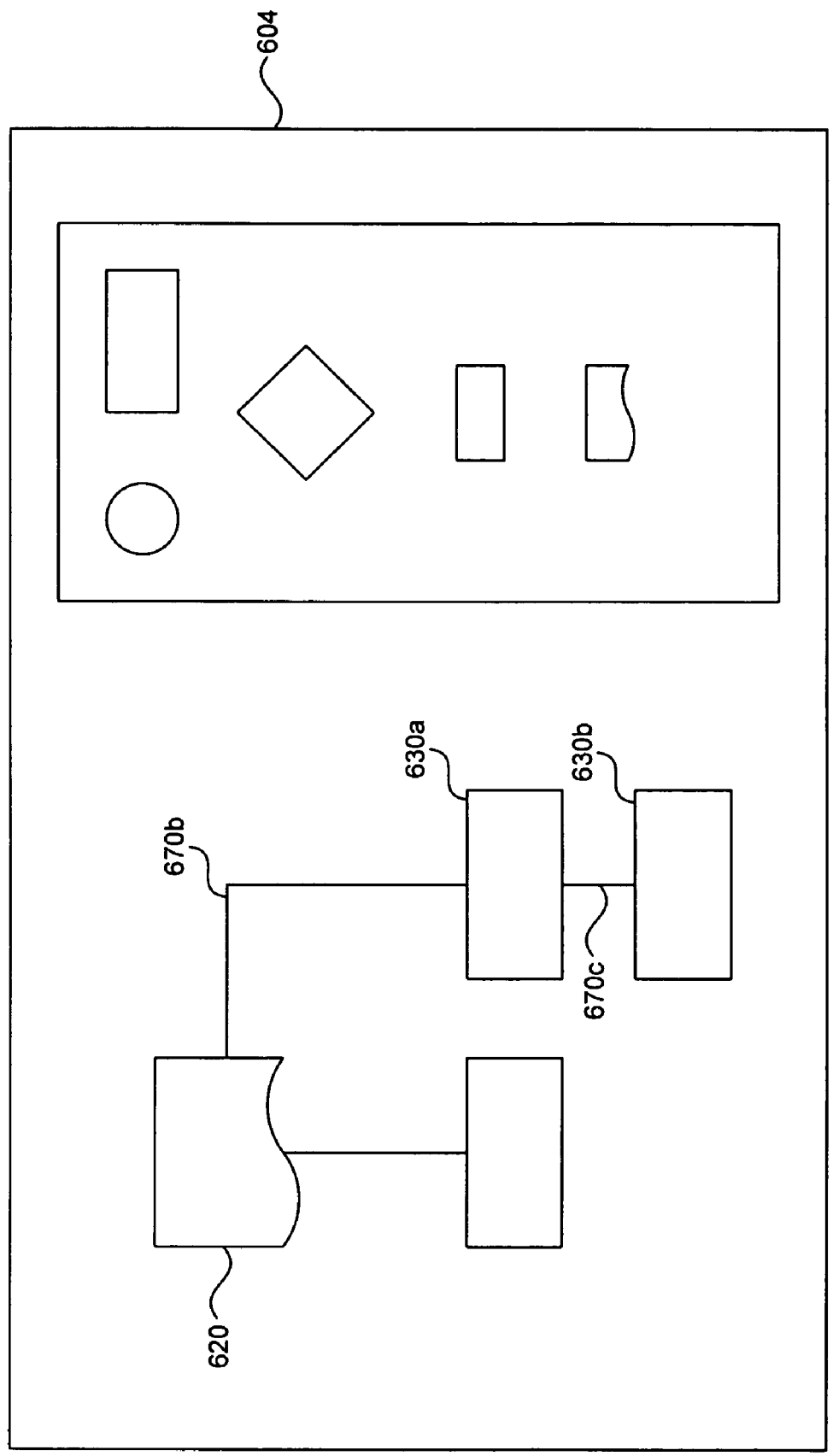
FIG. 8 is a partially schematic illustration of the display shown in FIG. 7 where the subjects have been associated with the target as suggested.

In FIG. 7, the cursor 650 has been positioned proximate to a selected object 665 in the drawing area, designating the selected object 665 as a target 620. Accordingly, the computing environment has provided (e.g., displayed) four suggested associations 640, shown as a first suggested association 640a, a second suggested association 640b, a third suggested association 640c, and a fourth suggested association 640d. The user has selected the first suggested association 640a by placing the cursor 650 proximate to the first suggested association 640a. Because the user has "dragged" the subjects 630 toward the target 620, the subjects 630 are also proximate to the first suggested association 640a. In the illustrated embodiment, a small "+2" is displayed proximate to the subjects 630, indicating that the user has designated two subjects. In other embodiments, other methods can be used to show multiple subjects (e.g., multiple symbols and/or overlapping shapes can be used to show multiple subjects).

In the illustrated embodiment, the computing environment also displays a preview of the association between the target 620 and the subjects(s) 630. In FIG. 7, the preview is shown in ghosted lines. Because another object 665 is connected to the target 620 with a first connector 670a extending away from the target 620 in the same direction as the first suggested association 640*a,* the preview shows the subjects 630 being positioned in the direction indicated by the first suggested association 640*a,* but a second connector 670*b* initially extends away from the target 620 in the direction of the second suggested association 640*b.* In other embodiments, the computing environment can de-conflict the placement of the subject(s) 630 in other manners and/or using other priorities. For example, in other embodiments multiple connectors can be attached to a single side of the target 620.

In the illustrated embodiment, the user commands the acceptance of the first suggested association 640*a* by releasing the mouse button (that was held down to drag the subjects 630 toward the target 620) while the cursor 650 is proximate to the first suggested association 640*a* (e.g., using a "drag and drop" type scheme). Once the first suggested association 640*a* has been accepted, the computing environment can associate the subject 630 with the target 620 as indicated by the first suggested association 640*a.* In FIG. 8, the subject 630 has been associated with the target 620, and a second connector 670*b* connects a first subject 630*a* to the target and a third connector 670*c* connects a second subject 630*b* to the target 620 via the first subject 630*a* and the second connector 670*b.* In other embodiments, multiple subjects 630 can be connected to the target 620 in other manners. For example, in certain embodiments each multiple subject 630 can be connected directly to the target 620 (e.g., each with a separate dedicated connector 670) without any intervening subjects 630.

In other embodiments, multiple subjects can be identified in other manners and/or from other areas. For example, in other embodiments objects can be identified using a keyboard (e.g., using the tab and enter keys). In still other embodiments, multiple subjects 630 can be identified using a point and click scheme. For example, the user can use the mouse to point at each of multiple objects 665 and click a button on the mouse while holding down a shift key to identify the multiple subjects 630. The point and click scheme discussed above with reference to FIGS. 3-5 can then be used to accept a suggested association 640, thereby associating multiple subjects with the target. In yet other embodiments, at least some of the subjects 630 can be selected from the drawing area 605.

Figure 9:
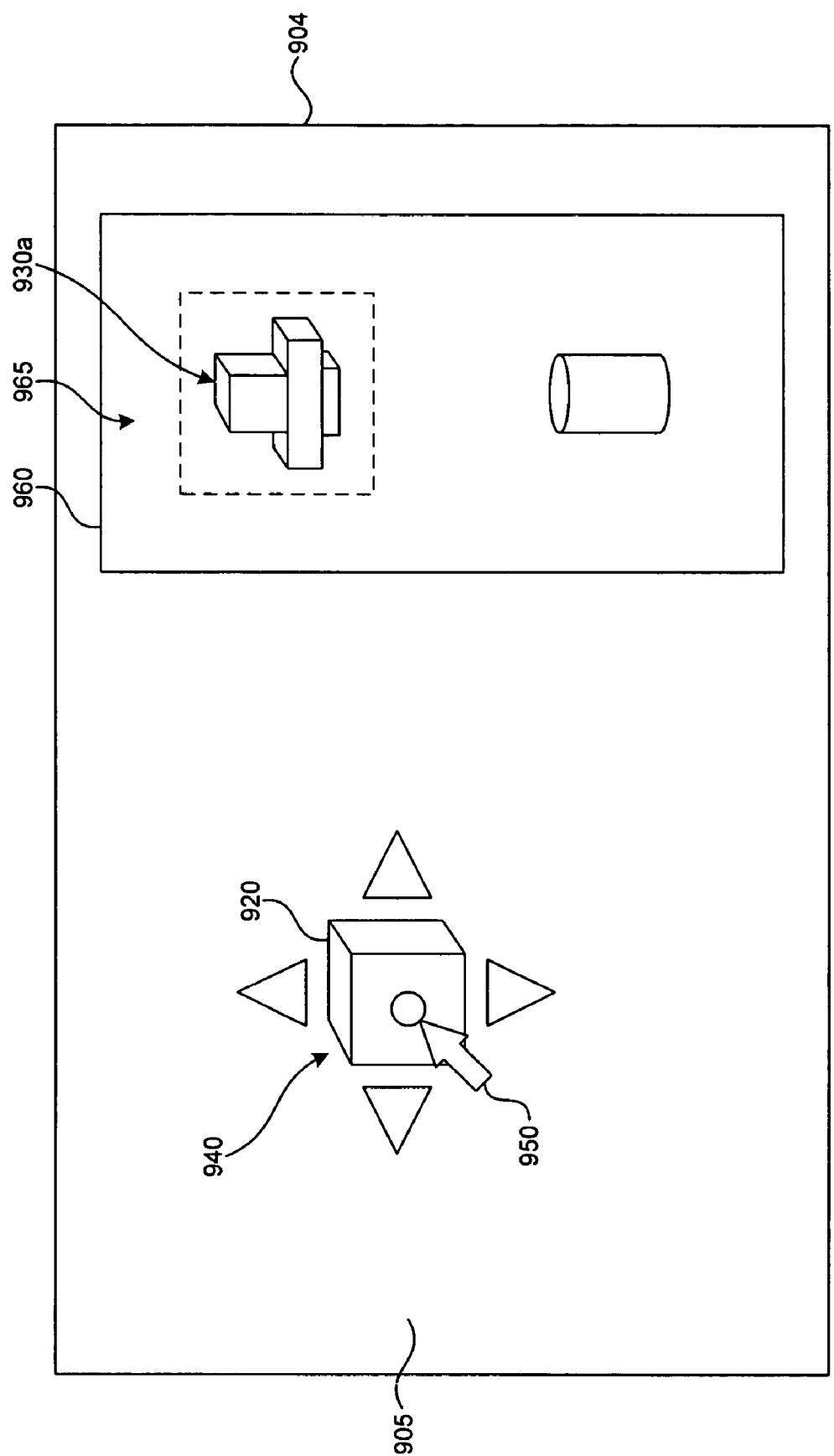
FIG. 9 is a partially schematic illustration of a display having at least one suggested association of a first subject with a target in accordance with still other embodiments of the invention.

FIG. 9 is a partially schematic illustration of a display 904 having at least one suggested association 940 of a first subject 930*a* with a target 920 in accordance with still other embodiments of the invention. In FIG. 9, the first subject 930*a* has been identified from objects 965 in an area 960, as indicated by the ghosted lines surrounding the designated object 965. In other embodiments, the subject(s) 930 can be selected from a drawing area 905 of the display 904. In the illustrated embodiment, the user has positioned the cursor 950 proximate to an object in the drawing area 905, designating the associated object as the target 920. In response, the computing environment has provided a suggested association 940 between the first subject 930*a* and the target 920.

In the illustrated embodiment, the suggested association 940 includes a circle surrounded by four arrows, indicating that subject(s) 930 will be associated with the target 920 in a sequence determined by the computing environment. For example, in one embodiment a first subject will be connected to the right, a second subject will be connected to the left, etc. In other embodiments, other displays and/or logic can be used. For example, in other embodiments only one arrow is displayed at a time and that arrow indicates the specific direction the next associated subject 930 will be placed. Additionally, the logic can provide that the subject(s) 930 be associated with the target 920 in a different sequence (e.g., the first subject 930 can be placed below the target 920 instead of to the right).

Figure 10:
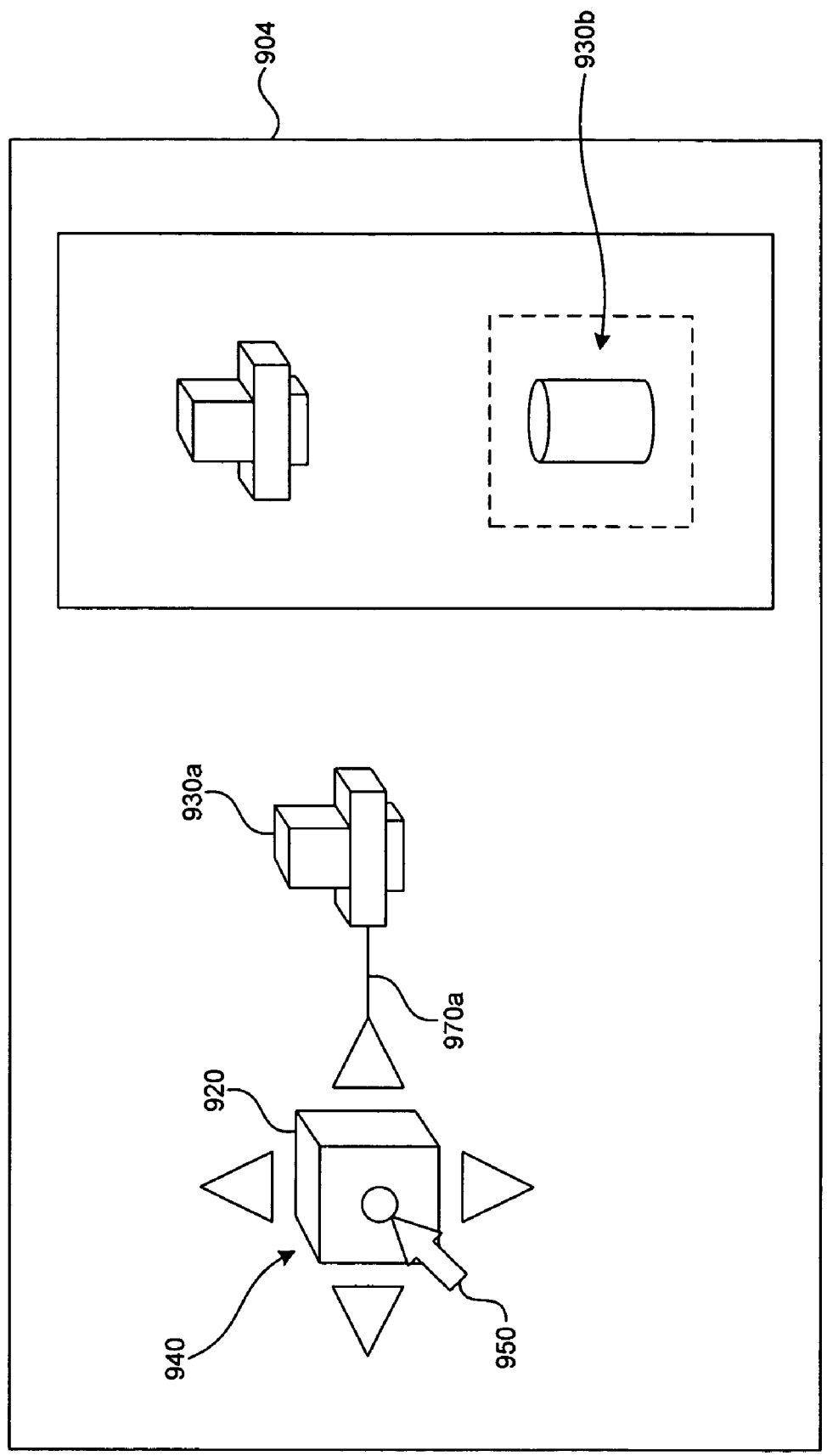
FIG. 10 is a partially schematic illustration of the display shown in FIG. 9 where the first subject has been associated with the target and at least one suggested association of a second subject with a target is being displayed.
Figure 11:
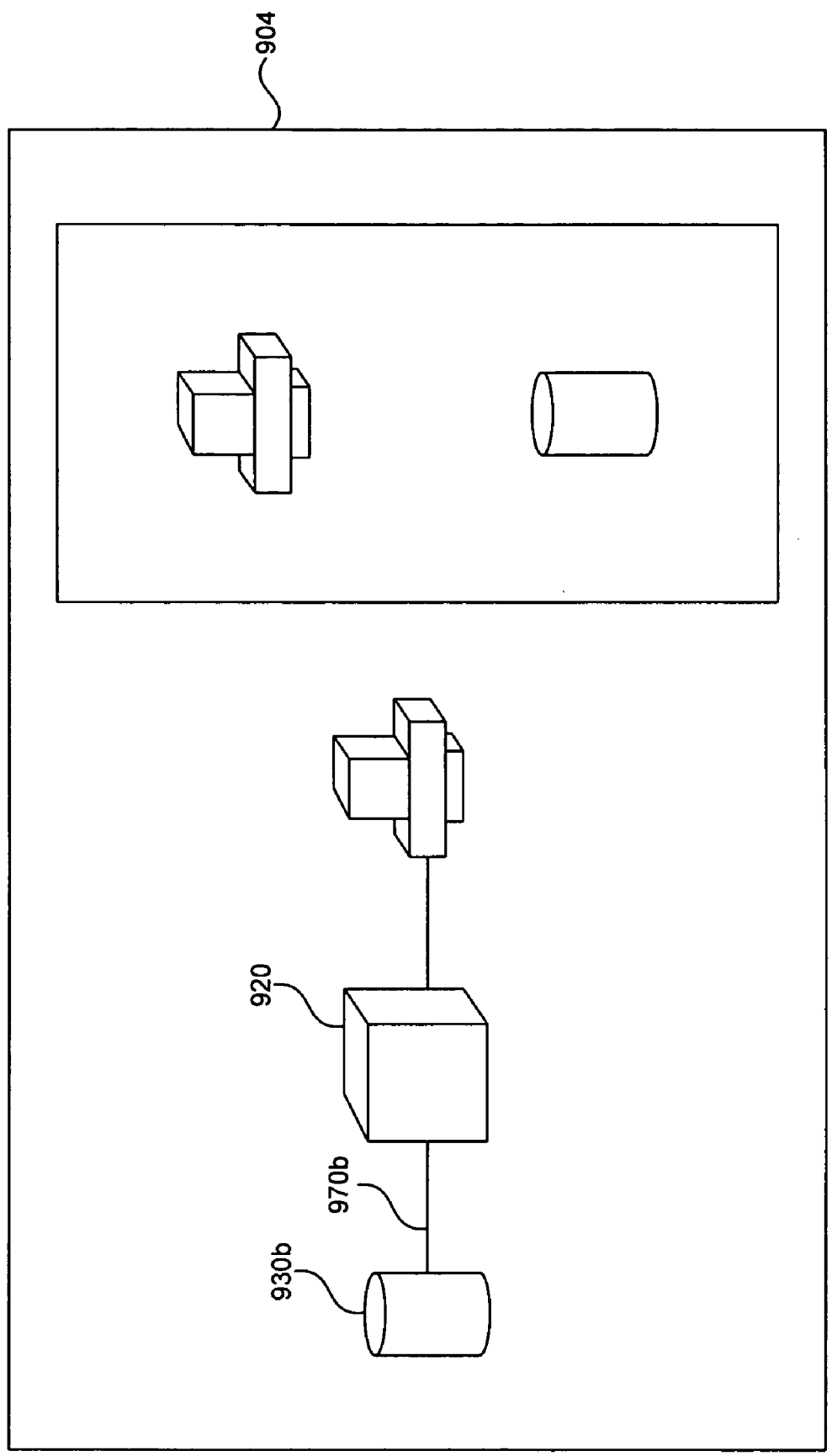
FIG. 11 is a partially schematic illustration of the display shown in FIG. 10 where the second subject has been associated with the target as suggested.

In FIG. 10 the user has commanded the acceptance of the suggested association 940 (e.g., by clicking a mouse button) and the first subject 930 has been connected to the right side of the target 920 with a first connector 970*a.* A second subject 930*b* has been selected. The cursor 950 is positioned proximate to an object, designating the object as the target 920 and the computing environment has provided a suggested association of the second subject 930*b* with the target 920. In FIG. 11, the suggested association 940 has been accepted and the second subject 930*b* has been connected to the second side of the target 920 with a second connector 970*b.*

Figure 12:
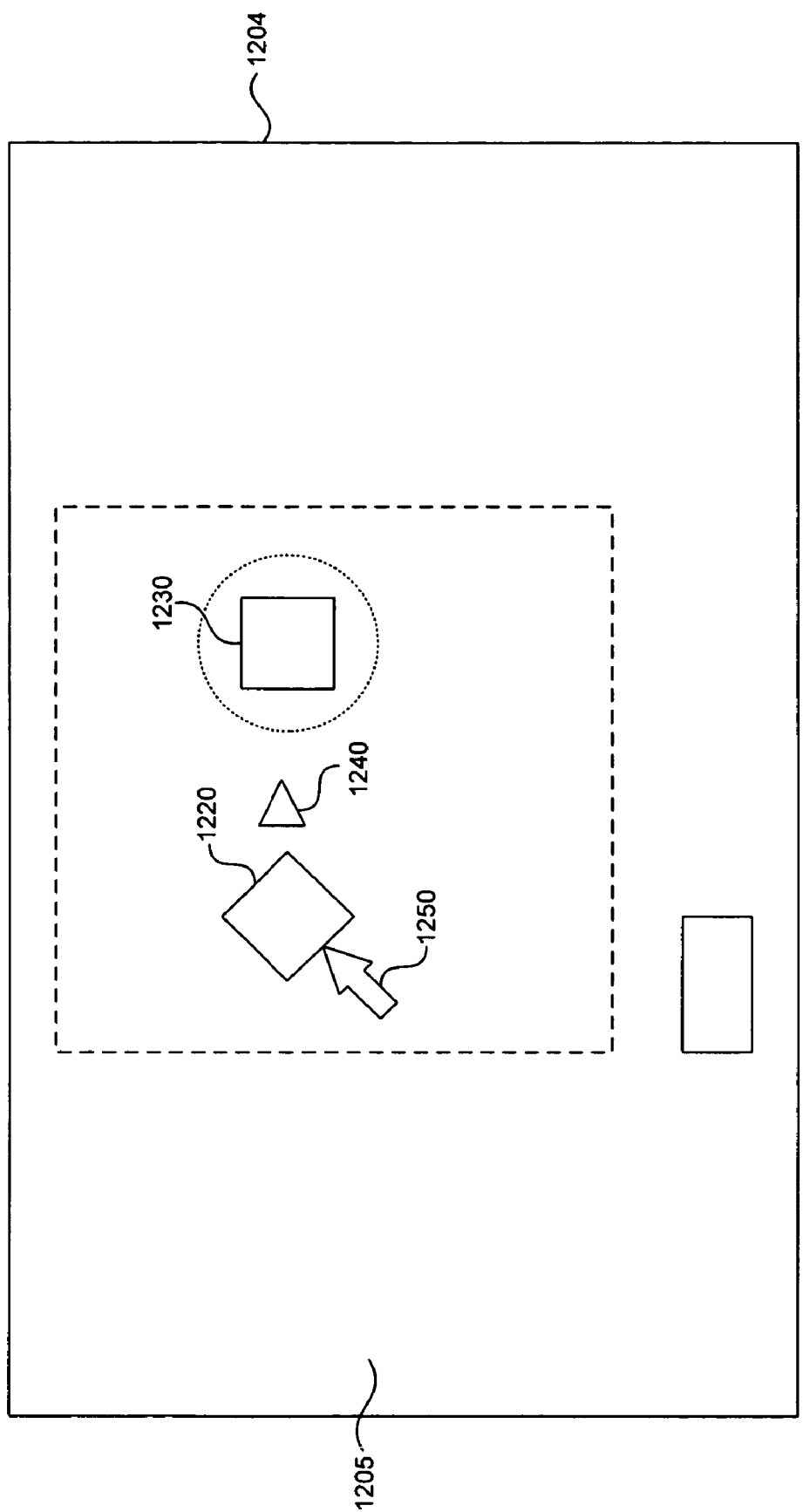
FIG. 12 is a partially schematic illustration of a display having at least one suggested association of a subject with a target in accordance with yet other embodiments of the invention.

FIG. 12 is a partially schematic illustration of a display 1204 having at least one suggested association 1240 of a subject 1230 with a target 1220 in accordance with yet other embodiments of the invention. In FIG. 12, a cursor 1250 has been place proximate to a first object in the drawing area 905, hit testing the first object. In the illustrated embodiment, when an object is hit tested, the computing environment searches within a selected area (indicated by the ghosted rectangle) to find the closest second object. If no object is found, then the first object is not designated as a target and no suggested associations are provided. If one or more second objects are found, the computing environment designates the first object as a target 1220, provides a suggested subject designation (e.g., a suggestion to designate the closest second object as a subject 1230), and provides a suggested association 1240 of the suggested subject with the target 1220. In FIG. 12, a ghosted circle indicates the suggested subject designation. In other embodiments, the size and shape of the search area can vary. For example, in certain embodiments the search area can be two or three times the width/height of the object that is hit tested. In other embodiments, the search area can be the entire display or the entire document.

Figure 13:
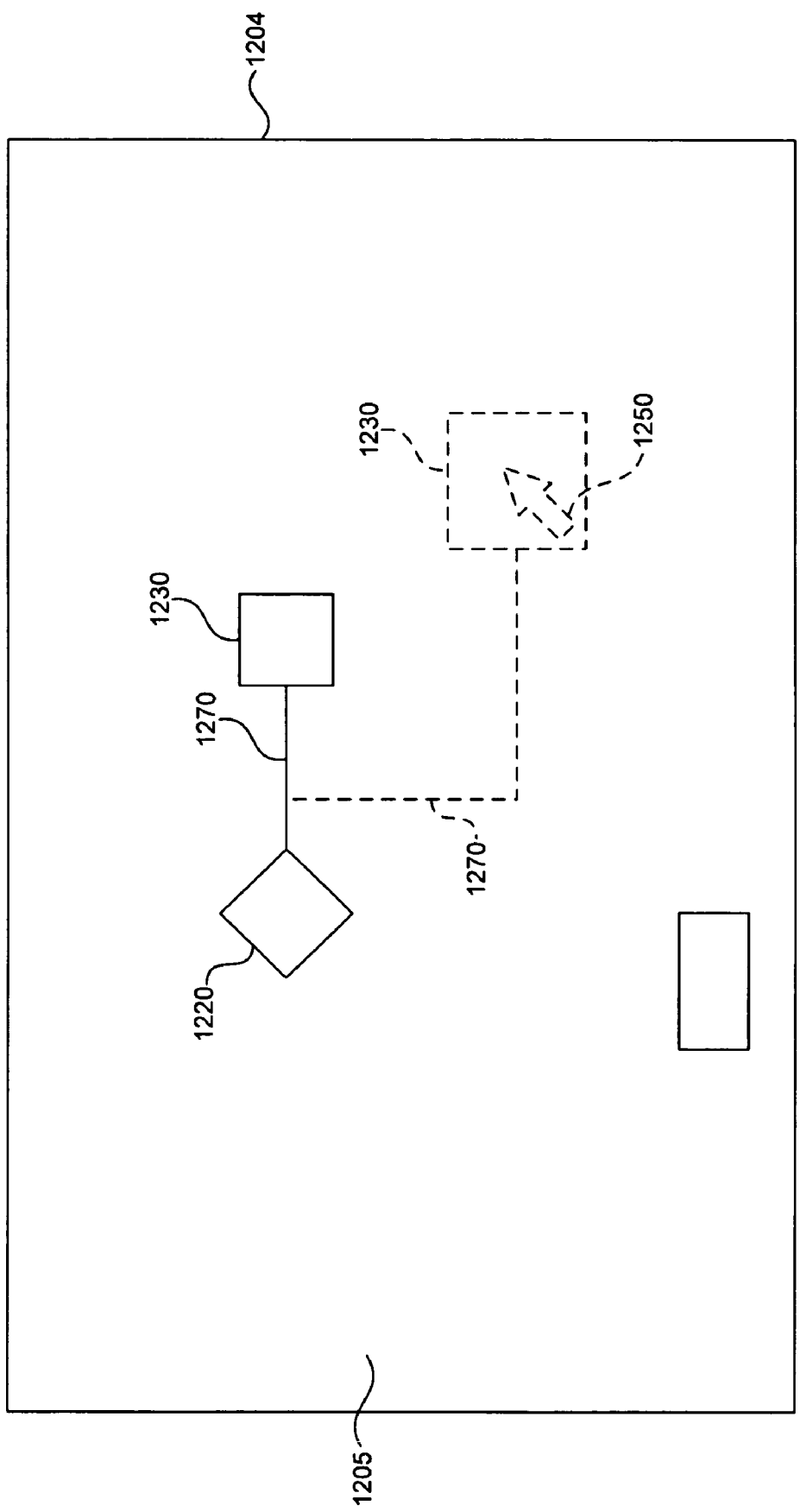
FIG. 13 is a partially schematic illustration of the display shown in FIG. 12 where the subject has been associated with the target as suggested.

In FIG. 13 the user has provided a command to accept the suggested subject designation and the computing environment has designated the associated object as the subject 1230, thereby identifying the subject 1230. Additionally, the user has commanded acceptance of the suggested association 1240 and the subject 1230 has been connected to the target 1220 with a connector 1270. In certain embodiments, the acceptance of the suggested subject designation and the suggested association can be accomplished with one user input. For example, in one embodiment the suggested subject designation and the suggested association can both be accepted by a single push of a button on a mouse. In other embodiments, separate commands can be used to accept the suggested subject designation and the suggested association. In still other embodiments, multiple suggested associations can be displayed and one of the multiple suggested associations can be selected after the subject has been identified.

Additionally, in FIG. 13, after the subject 1230 has been associated with the target 1220, the user has used the cursor 1250 to "drag" the subject 1230 to a new location on the drawing area 1205 (shown in ghosted lines in FIG. 13). In the illustrated embodiment, the connection 1270 is a dynamic or "glued" connection. Accordingly, as the subject 1230 and/or the target 1220 are moved (e.g., relatlve to one another) the target 1220 and the subject 1230 remain connected (e.g., via modification of the connector 1270). In other embodiments, connections accomplished via the acceptance of a suggested association are not dynamic connections. In still other embodiments, the user can choose whether or not a dynamic connection is made in response to the acceptance of a suggested association.

Figure 14:
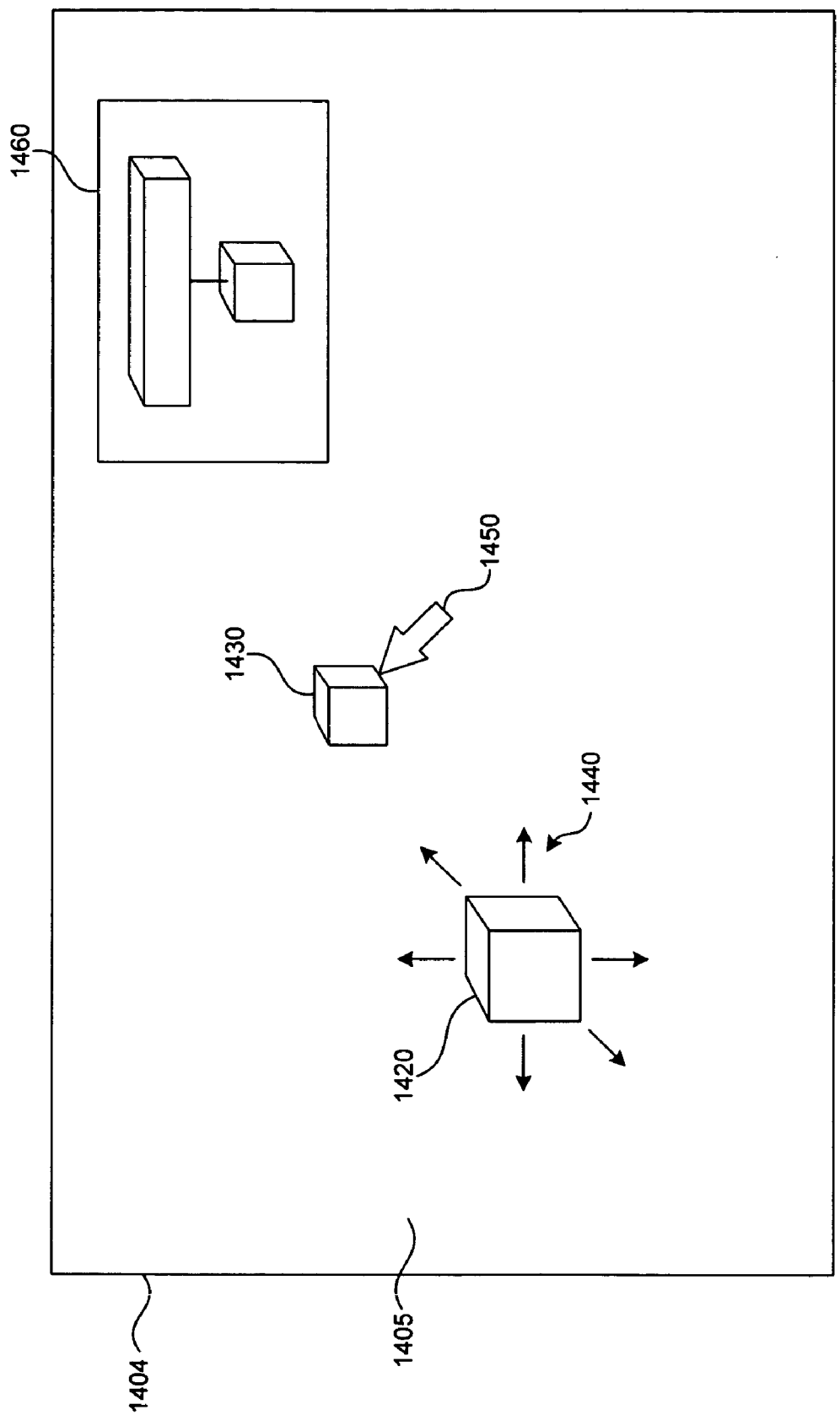
FIG. 14 is a partially schematic illustration of a display having at least one suggested association of a target with a subject in accordance with yet other embodiments of the invention.

While FIGS. 3-12 have illustrated two dimensional displays, aspects of the invention are equally applicable to three-dimensional displays. For example, FIG. 14 is a partially schematic illustration of a three-dimensional display 1404 having at least one suggested association 1440 of a target 1420 with a subject 1430 in accordance with yet other embodiments of the invention. In FIG. 14, the user has identified an object in the area 1460 as the subject 1430. Using a cursor 1450, the user has moved the subject 1430 (e.g., a copy of the object selected in area 1460) to a position proximate to a selected object in the drawing area 1405. The proximity of the cursor 1450 to the selected object in the drawing area 1405 has commanded the designation of the selected object as the target 1420. Accordingly, the computing environment has provided multiple suggested associations 1440 between the target 1420 and the subject 1430 in three-dimensions.

In other embodiments, a method in a computing environment for associating two objects in a drawing application with one another can include more, fewer, and/or different features. For example, in certain embodiments various features can be selected or deselected based on user preference or on the type of drawing or document that is selected (e.g., based on a template selection). In other embodiments, when visual indicators appear, their size, shape, and location relative to a designated target can change or be altered based on the proximity of adjacent objects in the drawing area.

From the foregoing, it will be appreciated that specific embodiments of the invention have been described herein for purposes of illustration, but that various modifications may be made without deviating from the invention. Additionally, aspects of the invention described in the context of particular embodiments may be combined or eliminated in other embodiments. For example, although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

We claim:

1. A method in a computing environment for associating two objects in a drawing application with one another, the method comprising:
   receiving a command to designate a target, the target including a first object on a drawing area of the drawing application;
   designating the target to be connected to a second object in the drawing area;
   identifying the second object to be connected to the first object;
   displaying a suggested association between the first object and the second object in the drawing area, wherein the suggested association is a visual indication identifying a direction relative to the target;
   receiving a command to accept the suggested association between the first object and the second object; and
   associating the second object with the target as suggested.

2. The method of claim 1 wherein associating the second object with the target includes at least one of placing the second object relative to the target in a selected direction and connecting the target to the second object with a connector.

3. The method of claim 1 wherein associating the second object with the target includes placing the second object relative to the target in a selected direction and connecting the target to the second object with a connector, the connection being a dynamic connection so that the target and second object remain connected by the connector when (a) the target is moved, (b) the second object is moved, or (c) both (a) and (b).

4. The method of claim 1 wherein identifying a second object includes:
   receiving a command to designate the second object from one and more objects in at least one of a drawing area and an area separate from the drawing area; and
   designating the second object as commanded.

5. The method of claim 1 wherein identifying a second object includes:
   suggesting a second object designation;
   receiving a command to accept the suggested second object designation; and
   designating the second object.

6. The method of claim 1 wherein the visual indication identifying a direction relative to the target indicates a suggested direction for (a) placing the second object relative to the target, (b) extending a connector away from the target, wherein the connector is suitable for connecting the target to the second object, or (c) both (a) and (b).

7. The method of claim 1 wherein the visual indication identifying a direction relative to the target indicates a suggested direction for (a) placing the second object relative to the target, (b) extending a connector away from the target, wherein the connector is suitable for connecting the target to the second object, or (c) both (a) and (b), and wherein the method further comprises removing the visual indicator.

8. The method of claim 1 wherein:
   identifying a second object includes identifying multiple second objects;
   displaying a suggested association between the first object and the second object in the drawing area includes providing a suggested association of each second object with the first object;
   receiving a command to accept the suggested association includes receiving a command to accept the suggested associations; and
   associating the second object with the target includes associating the second objects with the target as suggested.

9. The method of claim 1 wherein displaying a suggested association between the first object and the second object in the drawing area includes providing a first suggested association of the second object with the first object and at least one second suggested association of the second object with the first object.

10. A computer-implemented method for associating a first object with a second object in a drawing application, the method comprising:
   accepting a designation of the first object as a target for the second object to connect to, the first object being displayed in a first drawing area of the drawing application;
   accepting a selection of the second object from a plurality of objects displayed in a second drawing area of the drawing application, the second drawing area being separate from the first drawing area;
   displaying at least one suggested connection between the first object and the second object before the second object is displayed in the first drawing area, wherein the at least one suggested connection is not displayed until after the target is designated and the second object is selected, wherein the suggested connection is a visual indication identifying a direction relative to, the first object;
   receiving a command to accept one of the at least one suggested connection between the first object and the second object; and displaying the second object in the first drawing area based on the accepted one of the at least one suggested connection.

11. The method of claim 10 wherein displaying at least one suggested connection includes displaying at least one visual indicators identifying a direction relative to the target for placing the second object in the first drawing area.

12. The method of claim 10 wherein displaying at least one suggested connection includes displaying at least one visual indicators identifying a direction relative to the target for placing the second object in the first drawing area and a connector for connecting the first object to the second object when the second object is displayed in the first drawing area.

13. The method of claim 12 wherein displaying the second object includes displaying the second object in the first drawing area in the identified direction and displaying a connector between the first object and the second object.

14. The method of claim 10 wherein displaying at least one suggested connection includes displaying at least one visual indicators identifying a direction relative to the target for placing the second object in the first drawing area, the visual indicators being ghosted.

15. The method of claim 14 wherein displaying at least one suggested connection includes displaying at least one visual indicators identifying a direction relative to the target for placing the second object in the first drawing area, the visual indicators being unghosted when the command to accept one of the at least one suggested connection is received.

16. A computer-readable medium storing instructions for performing a method according to claim 10.

17. A computer-implemented system for associating a first object with a second object in a drawing application, the system comprising a computer-storage medium containing instructions that cause a processor to perform a method comprising:

accepting a designation of the first object as a target for the second object to connect to, the first object being displayed in a first drawing area of the drawing application;

accepting a selection of the second object from a plurality of objects displayed in a second drawing area of the drawing application, the second drawing area being separate from the first drawing area;

displaying at least one suggested connection between the first object and the second object before the second object is displayed in the first drawing area, wherein displaying the at least one suggested connection includes displaying at least one visual indicators identifying a direction relative to the target, and wherein the at least one suggested connection is not displayed until after the designation of the first object is accepted and the selection of the second object is accepted;

receiving a command to accept one of the at least one suggested connection between the first object and the second object; and displaying the second object in the first drawing area based on the accepted one of the at least one suggested connection.

18. The system of claim 17 wherein the at least one visual indicators identifying a direction relative to the target is for placing the second object in the first drawing area and wherein displaying the at least one suggested connection includes displaying a connector for connecting the first object to the second object when the second object is displayed in the first drawing area.

19. The system of claim 18 wherein displaying the second object includes displaying the second object in the first drawing area in the identified direction and displaying a connector between the first object and the second object.

* * * * *